UNITED STATES PATENT OFFICE.

RICHARD HEIM, OF PHILADELPHIA, PENNSYLVANIA.

ENAMEL FOR PAPERS.

1,381,991.     Specification of Letters Patent.   Patented June 21, 1921.

No Drawing.     Application filed September 2, 1919. Serial No. 321,194.

*To all whom it may concern:*

Be it known that I, RICHARD HEIM, a former subject of the Emperor of Germany, (having declared my intention of becoming a citizen of the United States,) residing at Philadelphia, in the county of Philadelphia and State of Pennsylvania, have invented new and useful Improvements in Enamels for Papers, of which the following is a specification.

My invention relates to a new and useful improvement in an enamel for paper, said enamel to be used as an impervious coating for general purposes and more especially in the art of coating papers such as glazed, label, print and lithographic papers.

"Enamel" as it is termed commonly by the paper coaters consists of:—

1. Pigments such as clay, lime, calcium compounds or barium compounds.
2. A size or binder, viz., a solution of glue, casein, starch, sodium silicate or other adhesives, and
3. The necessary quantity of water to keep the pigments and size in suspension and to impart to the enamel the desired fluidity and spreading power.

As an example of pigments I refer to any base or opaque or semi-opaque substance in a dry or pulpy form. Of all these substances the most widely known and used is clay and precipitated aluminum in slaked lime known to the trade as "satin white". It is produced by combining alum or aluminum sulfate with slaked lime, the sulfuric acid in the alum being absorbed by the lime and the aluminum precipitated in the lime.

When casein is used as a binder the milk albumins are apt to form with the lime an insoluble combination thus producing a more or less impervious film on the paper. However, if starch is substituted for casein the result is less satisfactory, the starch solution being inert to the pigments and without any chemical action on them.

In order to achieve with a starch solution an impervious film I add to the pulp, consisting of clay, slaked lime in putty form or lime and precipitated alum, a certain quantity of a modified, sulfonated or vulcanized oil mixable with water and inclined to form with the lime an impervious film.

The quantity of oil is governed by the kind and quality of paper the coater expects to produce. I have found however, that one hundred parts by weight of pigments, consisting of one part of lime putty and one part of clay, and ten parts by weight of a modified oil will produce a most satisfactory result and a perfectly impervious film.

In carrying out either of these processes drying or non-drying vegetable oils can be used.

By modified oil I mean oil having been subjected to an oxidizing process by heating the oil with a current of hot air, blown into the oil until it has changed to the desired consistency or reduced to a putty-like state.

Sulfonated oil is an oil heated in a kettle to a high temperature with ten to twenty per cent. of pulverized pure sulfur dissolved therein.

Vulcanized oil is treated simply with a chemical viz, sulfur chlorid. The combining of the oil with the chemical is most intimate and instantaneous. Either of these treatments can be extended and increased so the oils will lose their former character and fluidity and turn into an extremely tough, elastic, rubber like mass, fit to be used as a substitute for rubber, insoluble in an alkaline solution and acids.

In carrying out my process I add to one hundred parts by weight, of pigments, being in a smooth putty like state, from five to twenty five parts, by weight, of a modified oil stirring the oil and the pigments until the former is thoroughly incorporated in the latter after which I add the size and necessary quantity of water to give the color the necessary flow.

However I can add the oil to the size or enamel itself without departing from the spirit of my invention.

Having thus fully described my invention, what I claim as new and useful is:—

1. An enamel consisting of pigments, a size, water and a modified oil.
2. An enamel consisting of pigments, a size, and an oil reduced to a putty-like state.

In testimony whereof I have hereunto affixed my signature.

RICHARD HEIM.